United States Patent
Ji et al.

(10) Patent No.: US 7,068,463 B1
(45) Date of Patent: Jun. 27, 2006

(54) DISK DRIVE EMPLOYING A VELOCITY PROFILE AND BACK EMF FEEDBACK TO CONTROL A VOICE COIL MOTOR

(75) Inventors: Chuanwen Ji, Irvine, CA (US); Jianghong Ding, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/868,551

(22) Filed: Jun. 14, 2004

(51) Int. Cl.
*G11B 21/02* (2006.01)
(52) U.S. Cl. ..................... 360/78.04; 360/75
(58) Field of Classification Search ............. 360/78.04, 360/78.01
See application file for complete search history.

(56) References Cited

U.S. PATENT DOCUMENTS

| | | | |
|---|---|---|---|
| 4,864,437 A | 9/1989 | Couse et al. | |
| 5,568,333 A | 10/1996 | Bang | |
| 5,600,219 A | 2/1997 | Gomez | |
| 5,844,743 A * | 12/1998 | Funches | 360/78.04 |
| 6,028,744 A | 2/2000 | Amirkiai et al. | |
| 6,081,112 A | 6/2000 | Carobolante et al. | |
| 6,097,564 A | 8/2000 | Hunter | |
| 6,140,791 A * | 10/2000 | Zhang | 318/632 |
| 6,212,027 B1 | 4/2001 | Lee et al. | |
| 6,222,696 B1 | 4/2001 | Kim | |
| 6,396,652 B1 * | 5/2002 | Kawachi et al. | 360/75 |
| 6,441,987 B1 | 8/2002 | Lee | |
| 6,441,988 B1 | 8/2002 | Kang et al. | |
| 6,445,531 B1 | 9/2002 | Gaertner et al. | |
| 6,535,358 B1 | 3/2003 | Hauert et al. | |
| 6,597,529 B1 | 7/2003 | DeRose | |
| 6,624,964 B1 | 9/2003 | Pirzadeh | |
| 6,791,785 B1 | 9/2004 | Messenger et al. | |

* cited by examiner

*Primary Examiner*—Wayne Young
*Assistant Examiner*—Jason Olson
(74) *Attorney, Agent, or Firm*—Howard H. Sheerin, Esq.

(57) ABSTRACT

A disk drive is disclosed comprising a disk having a plurality of tracks, an actuator arm, a head connected to a distal end of the actuator arm, and a voice coil motor (VCM) for rotating the actuator arm about a pivot to actuate the head over the disk. A driving current is applied to the VCM to control the motion of the actuator arm. A back EMF voltage generated by the VCM is detected, and a velocity of the VCM is estimated in response to the back EMF voltage. The estimated VCM velocity is compared to a target velocity in a velocity profile, wherein the velocity profile comprises at least an acceleration component and a coast component. The driving current is adjusted in response to the comparison so that the velocity of the VCM substantially follows the velocity profile.

22 Claims, 7 Drawing Sheets

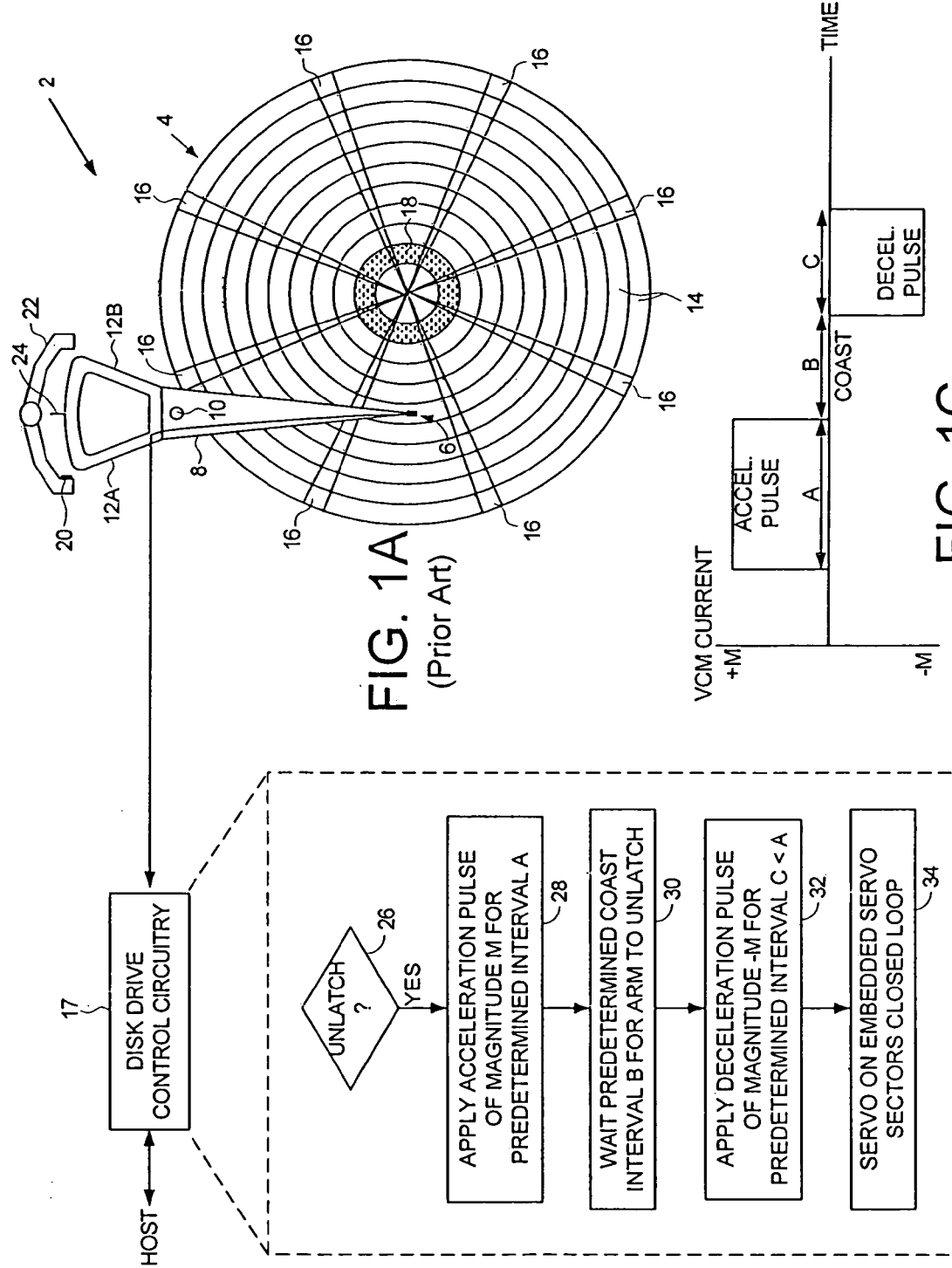

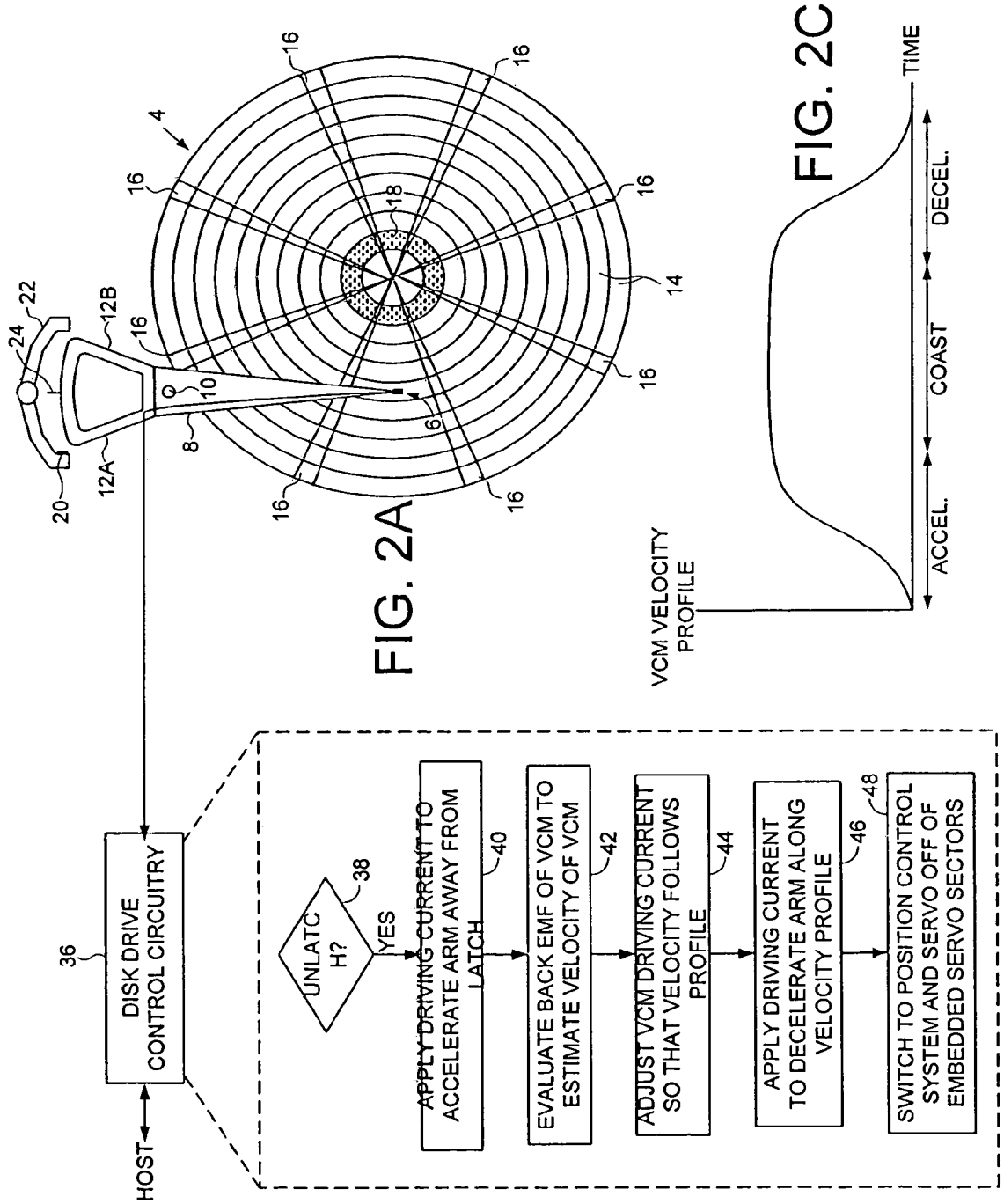

DISK DRIVE EMPLOYING A VELOCITY PROFILE AND BACK EMF FEEDBACK TO CONTROL A VOICE COIL MOTOR

CROSS REFERENCE TO RELATED APPLICATIONS AND PATENTS

This application is related to U.S. Pat. No. 6,535,358 entitled "DISK DRIVE COMPRISING A PLASTIC MOLDED CRASH STOP WITH EMBEDDED MAGNET FOR LATCHING AN ACTUATOR ARM" the disclosure of which are incorporated herein by reference.

BACKGROUND OF THE INVENTION

1. Field of the Invention

The present invention relates to disk drives. More particularly, the present invention relates to a disk drive employing a velocity profile and back EMF feedback to control a voice coil motor.

2. Description of the Prior Art

FIG. 1A shows a prior art disk drive 2 comprising a disk 4 and a head 6 actuated over the disk 4 by a voice coil motor (VCM). The head 6 is connected to the distal end of an actuator arm 8 which is rotated about a pivot 10 in order to actuate the head 6 radially over the disk 4. The VCM comprises a voice coil attached to the actuator arm 8 having a first leg 12A and a second leg 12B for conducting current in a clockwise or counterclockwise direction thereby generating a magnetic flux which interacts with the magnetic field of permanent magnets (not shown) to generate a torque to rotate the actuator arm 8 about the pivot 10 in a clockwise or counterclockwise direction. The disk 4 comprises a plurality of tracks 14 defined by a plurality of embedded servo sectors 16, wherein disk drive control circuitry processes the embedded servo sectors 16 in a closed-loop servo system to seek the head 6 to a target track and maintain the head 6 over the target track during read/write operations.

When the disk drive is powered down (or otherwise idle), disk drive control circuitry 17 performs a park operation wherein the head 6 is parked and the actuator arm 8 is latched. In the embodiment of FIG. 1A, the head 6 is parked on a landing zone 18 by rotating the actuator arm 8 in the counterclockwise direction. While the head 6 is parked, the actuator arm 8 is "latched" to prevent it from rotating the head 6 away from the landing zone 18. In the embodiment of FIG. 1A, a magnet 20 attached to a crash stop 22 attracts and holds a metal tang 24 attached to the actuator arm 8. Alternatively, the actuator arm 8 may be parked on a ramp located at the outer periphery of the disk 4 using a technique known as ramp-load/ramp-unload.

FIG. 1B shows a flow diagram of the steps executed by the disk drive control circuitry 17 to unlatch the actuator arm 8 when the disk drive is powered up (or otherwise comes out of an idle state). The actuator arm 8 is typically unlatched by driving the VCM with an open-loop current since position (or velocity) information is unavailable. FIG. 1C shows a waveform illustrating the open-loop current applied to the VCM to unlatch the actuator arm 8. Referring to FIG. 1B, when an unlatch operation is initiated at step 26, an acceleration pulse is applied to the VCM at step 28 to unlatch the tang 24 from the magnet 20. The acceleration pulse comprises a current of predetermined magnitude +M applied to the VCM for a predetermined interval A (FIG. 1C). At step 30 a coast interval B allows the tang 24 to "escape" the latching force of the magnet 20. At step 32 a deceleration pulse is applied to the VCM to decelerate the actuator arm 8 to enable closed-loop position control of the actuator arm 8 by reading the embedded servo sectors 16. The deceleration pulse comprises a current of magnitude −M applied to the VCM for a predetermined interval C. The deceleration interval C is less than the acceleration interval A due to the force needed to escape the latching force of the magnet 20. The magnitude −M of the deceleration pulse is equal (or nearly equal) the magnitude +M of the acceleration pulse resulting in a "bang—bang" open-loop current profile.

Using a "bang—bang" open-loop current profile for unlatching the actuator arm 8 can generate undesirable acoustic noise for certain applications, such as digital video recorders. In addition, the "bang—bang" open-loop control may cause the head to wobble when the actuator arm unlatches thereby damaging the head 6 and or the surface of the disk 4. U.S. Pat. No. 6,097,564 teaches to estimate the velocity of the VCM from the back EMF voltage across the voice coil and to use the estimated velocity in a closed-loop system to limit the maximum velocity of the actuator arm 8 after applying an acceleration pulse. Although this technique reduces damage to the head 6 and or surface of the disk 4 during the coast interval, it does not reduce head wobble during the acceleration and deceleration intervals. Further, the '564 patent does not address the acoustic noise problem due to the "bang—bang" acceleration/deceleration pulses applied to the VCM.

U.S. Pat. No. 6,535,358 presents another problem associated with unlatching the actuator arm 8 using a "bang—bang" open-loop current profile. In the '358 patent, a magnet is embedded at least partially into a plastic crash stop, for example, using injection molding techniques. With at least part of the plastic disposed between the magnet and the tang, the maximum latching force of the magnet is reduced while maintaining sufficient latching energy. This reduces the magnitude of the acceleration pulse needed to unlatch the actuator arm 8 which reduces the maximum velocity of the actuator arm 8 during unlatch as well as the maximum torque requirements of the VCM. However, the stickiness of the plastic surface to the tang 24 can vary between disk drives as well as over time and temperature leading to inconsistent unlatch performance if nominal "bang—bang" acceleration/deceleration pulses are employed.

Acoustic noise is also a problem during the latching operation due to the tang 24 colliding with the magnet 20. The prior art latching operation typically applies a constant acceleration current to the VCM to accelerate the actuator arm 8 until it latches. As the tang 24 approaches the magnet 20, the exponential increase in the force of the magnet 20 and the corresponding increase in the acceleration of the actuator arm 8 further exacerbates the acoustic noise when the tang 24 collides with the magnet 20.

There is, therefore, a need to improve the unlatching/latching or ramp-loading/ramp-unloading operations in a disk drive.

SUMMARY OF THE INVENTION

The present invention may be regarded as a disk drive comprising a disk having a plurality of tracks, an actuator arm, a head connected to a distal end of the actuator arm, and a voice coil motor (VCM) for rotating the actuator arm about a pivot to actuate the head over the disk. A driving current is applied to the VCM to control the motion of the actuator arm. A back EMF voltage generated by the VCM is detected, and a velocity of the VCM is estimated in response to the back EMF voltage. The estimated VCM velocity is compared to a target velocity in a velocity profile, wherein the velocity profile comprises at least an acceleration component and a coast component. The driving current is adjusted in response to the comparison so that the velocity of the VCM substantially follows the velocity profile.

In one embodiment, the velocity profile comprises a deceleration component.

In another embodiment, the acceleration component comprises a curve shape, and in one embodiment an S shape.

In yet another embodiment, the VCM is controlled to unlatch the actuator arm, and in another embodiment to latch the actuator arm.

In still another embodiment, a latch distance is estimated corresponding to a distance the actuator arm travels during the latch operation. In one embodiment, the latch distance is estimated by performing an unlatch operation to unlatch the actuator arm, and integrating the estimated VCM velocity during the unlatch operation to estimate an unlatch distance. The integration stops when an unlatch track ID is detected corresponding to a position of the head after the unlatch operation. A seek operation seeks the head to an inner diameter track while integrating the estimated VCM velocity to estimate the seek distance, and the estimated seek distance is subtracted from the estimated unlatch distance to estimate the latch distance.

In another embodiment, the latch distance is estimated by performing a seek operation to seek the head to an inner diameter track, moving the actuator arm toward the latch, and integrating the estimated VCM velocity while moving the actuator arm to estimate the latch distance. The integration is stopped when the back EMF voltage reverses polarity indicating that the actuator arm has latched.

In still another embodiment, the actuator arm is latched by performing a seek operation to seek the head to an inner diameter track, moving the actuator arm toward the latch according to the acceleration component and coast component of the velocity profile, and integrating the estimated VCM velocity while moving the actuator arm to estimate a distance traveled. When the estimated distance traveled equals the estimated latch distance minus an estimated deceleration distance, the actuator arm is decelerated toward the latch according to the deceleration component of the velocity profile. In one embodiment, the estimated deceleration distance is the integral of the deceleration component of the velocity profile.

In another embodiment, the disk drive further comprises a magnetic latch having a stationary magnet for attracting a metal component of the actuator arm. The magnet is covered at least partially with an insulating material, and at least part of the insulating material is between the magnet and the metal component of the actuator arm to reduce the maximum latching force of the magnet. In one embodiment the insulating material comprises plastic, and in another embodiment rubber.

The present invention may also be regarded as a method of controlling the motion of an actuator arm in a disk drive, the disk drive comprising a disk having a plurality of tracks, the actuator arm, a head connected to a distal end of the actuator arm, and a voice coil motor (VCM) for rotating the actuator arm about a pivot to actuate the head over the disk. A driving current is applied to the VCM to control the motion of the actuator arm. A back EMF voltage generated by the VCM is detected, and a velocity of the VCM is estimated in response to the back EMF voltage. The estimated VCM velocity is compared to a target velocity in a velocity profile, wherein the velocity profile comprises at least an acceleration component and a coast component. The driving current is adjusted in response to the comparison so that the velocity of the VCM substantially follows the velocity profile.

BRIEF DESCRIPTION OF THE DRAWINGS

FIG. 1A shows a prior art disk drive comprising a disk, a head connected to a distal end of an actuator arm and actuated over the disk by a VCM, and disk drive control circuitry for controlling the VCM to control the motion of the actuator arm.

FIG. 1B is a flow diagram executed by the prior art disk drive control circuitry for unlatching the actuator arm using a "bang—bang" open-loop current profile.

FIG. 1C illustrates the prior art "bang—bang" current profile comprising an acceleration pulse, a coast interval, and a deceleration pulse.

FIGS. 2A–2B show a disk drive according to an embodiment of the present invention wherein the disk drive control circuitry unlatches the actuator arm by controlling the VCM according to a closed-loop velocity profile using the back EMF voltage as feedback.

FIG. 2C shows a velocity profile according to an embodiment of the present invention comprising an acceleration component, a coast component, and a deceleration component.

DESCRIPTION OF THE PREFERRED EMBODIMENTS

Figure 3A:
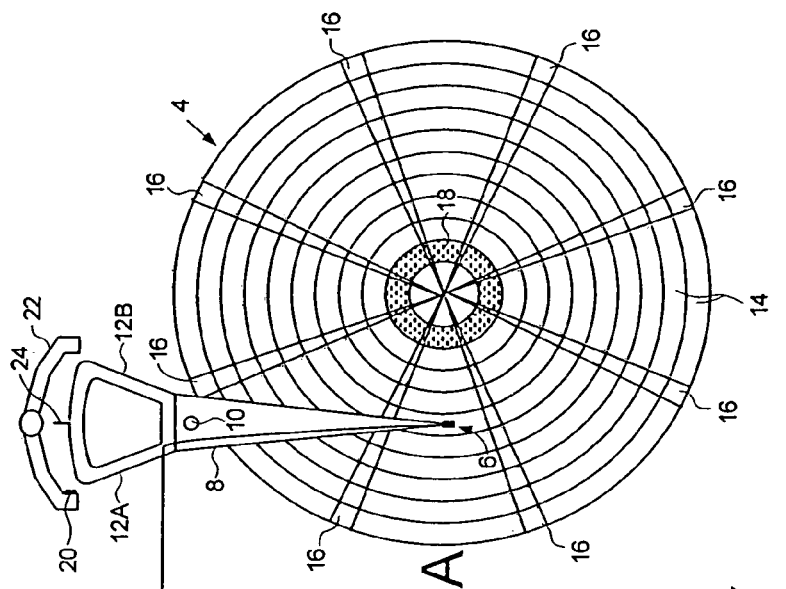
FIGS. 3A–3B show a disk drive according an embodiment of the present invention wherein the disk drive control circuitry latches the actuator arm by controlling the VCM according to a closed-loop velocity profile using the back EMF voltage as feedback.

FIG. 2A shows a disk drive according to an embodiment of the present invention comprising a disk 4 having a plurality of tracks 14, an actuator arm 8, a head 6 connected to a distal end of the actuator arm 8, and a voice coil motor (VCM) for rotating the actuator arm 8 about a pivot 10 to actuate the head 6 over the disk 4. The VCM comprises a voice coil having a first leg 12A and a second leg 12B which generate a magnetic flux when energized with current, the magnetic flux interacting with permanent magnets (not shown) to generate a rotational torque. FIG. 2B shows a flow diagram executed by disk drive control circuitry 36 for unlatching the actuator arm 8. When an unlatch operation is initiated at step 38, at step 40 a driving current is applied to the VCM to control the motion of the actuator arm 8. At step 42 a back EMF voltage generated by the VCM is detected, and a velocity of the VCM is estimated in response to the back EMF voltage. The estimated VCM velocity is compared to a target velocity in a velocity profile, wherein the velocity profile comprises at least an acceleration component and a coast component as shown in FIG. 2C. At step 44, the driving current is adjusted in response to the comparison so that the velocity of the VCM substantially follows the velocity profile.

In one embodiment, the velocity profile comprises a deceleration component as shown in FIG. 1C, and at step 46 of FIG. 2B the driving current is adjusted so that the velocity of the VCM substantially follows the deceleration component. Once the VCM slows to a predetermined velocity, at step 48 the disk drive control circuitry 36 processes the embedded servo sectors 16 to control the motion of the actuator arm 8 in a closed-loop servo system. Controlling the VCM in a closed-loop system using the back EMF voltage as feedback reduces head wobble and attenuates acoustic noise as compared the prior art "bang—bang" open-loop current profile of FIG. 1C.

In one embodiment, the acceleration and deceleration components of the velocity profile comprise an arc shape and in the embodiment of FIG. 2C comprise an S shape. The S shape acceleration and deceleration curves help "smooth out" the sharp edges of the current profile (attenuate the high harmonics of the prior art square wave current profile) resulting in quieter operation during acceleration/deceleration.

Figure 3C:
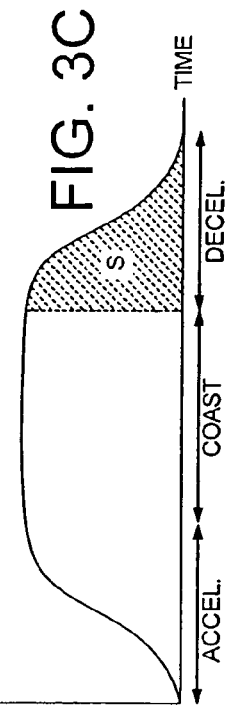
FIG. 3C shows the velocity profile for latching the actuator arm wherein a deceleration distance S is estimated by integrating the deceleration component of the velocity profile.
Figure 3B:
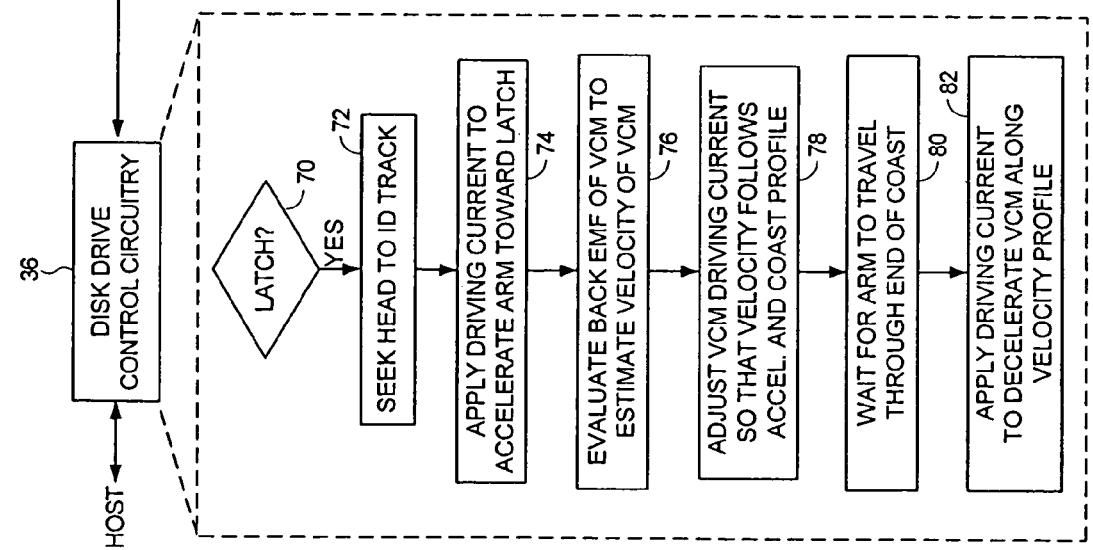

FIGS. 3A–3B show an embodiment of the present invention wherein the disk drive control circuitry 36 latches the actuator arm 8 by controlling the VCM according to a closed-loop velocity profile using the back EMF voltage as feedback. FIG. 3C shows an example embodiment of the velocity profile for latching the actuator arm 8 which is similar to the velocity profile of FIG. 2C for unlatching the actuator arm 8. In one embodiment, the disk drive control circuitry 36 estimates a latching distance corresponding to a distance the actuator arm 8 travels during the latch operation. In the example embodiment of FIG. 3A, the latching distance corresponds to the distance between the tang 24 and the magnet 20 when the head 6 is positioned over the inner diameter track when the latch operation is initiated. That is, the latch distance equals the distance the tang 24 travels before contacting the magnet 20.

Figure 4A:
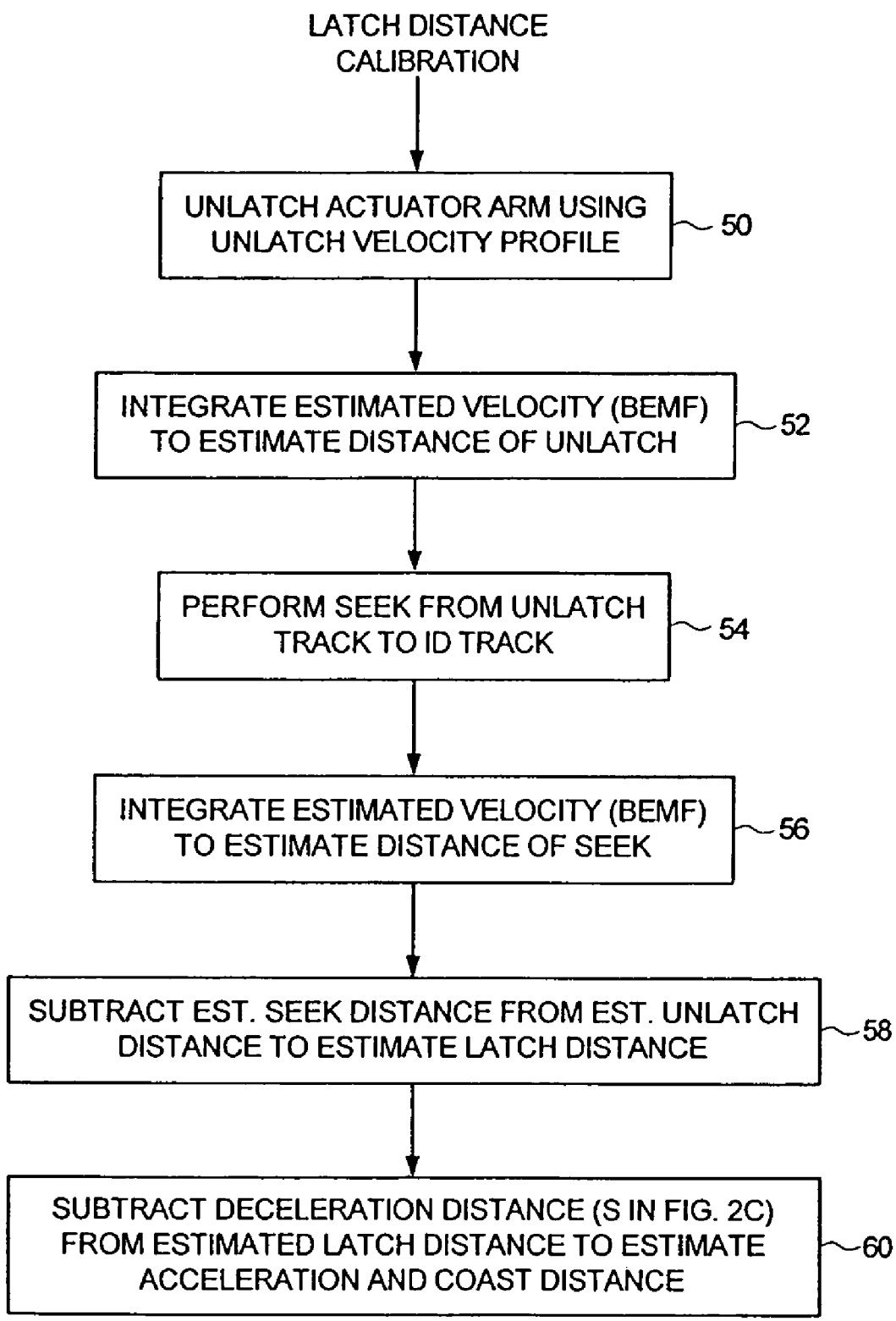
FIG. 4A is a flow diagram for estimating the latch distance of the actuator arm by integrating the estimated VCM velocity during an unlatch operation and subtracting a seek distance from an unlatch track to an inner diameter track.

FIG. 4A is a flow diagram illustrating an embodiment of the present for estimating the latch distance. The procedure begins with the actuator arm 8 in the latch position, wherein at step 50 the disk drive control circuitry 36 applies a driving current to the VCM using the unlatch velocity profile (FIG. 2C) to unlatch the actuator arm 8. As the actuator arm 8 is moving during the unlatch operation, at step 52 the estimated VCM velocity is integrated to estimate the distance moved (unlatch distance). At the end of the unlatch operation, the track ID corresponding to the position of the head 6 is detected. At step 54 the disk drive control circuitry 36 performs a seek operation to seek the head 6 from the unlatch track ID to an inner diameter track on the disk 4. During the seek operation, at step 56 the estimated VCM velocity is integrated to estimate the distance of the seek. At step 58 the estimated seek distance is subtracted from the estimated unlatch distance to estimate the latch distance. At step 60, the deceleration distance S (corresponding to the integral of the deceleration velocity profile in FIG. 3C) is subtracted from the estimated latch distance to estimate the acceleration and coast distance corresponding to the acceleration and coast components of the velocity profile (FIG. 3C).

Figure 4B:
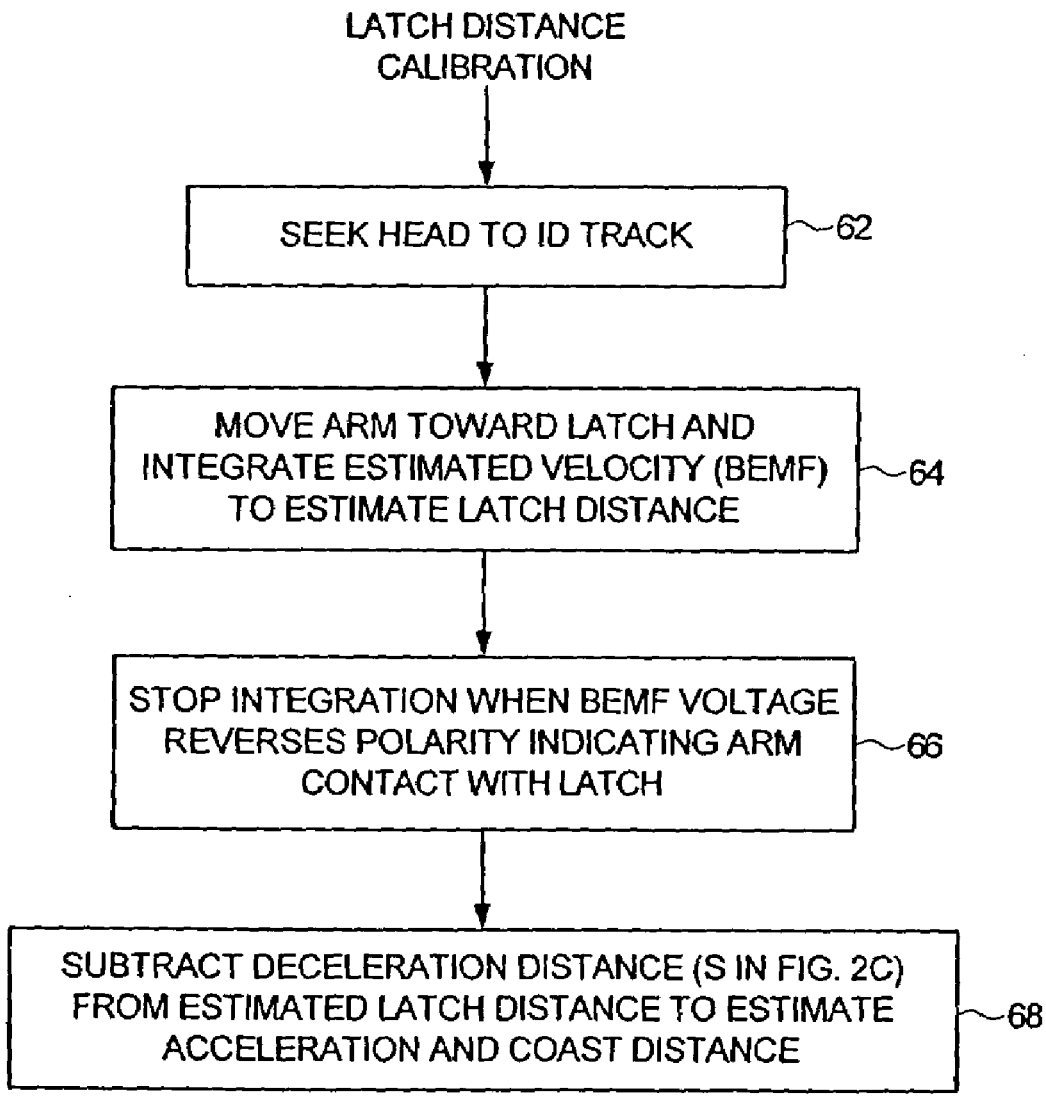
FIG. 4B is a flow diagram for estimating the latch distance of the actuator arm by integrating the estimated VCM velocity during a latch operation and detecting when the back EMF voltage reverses polarity.

FIG. 4B is a flow diagram illustrating an alternative embodiment for estimating the latch distance. At step 62 the disk drive control circuitry 36 seeks the head 6 to an inner diameter track on the disk 4. At step 64 the disk drive control circuitry 36 applies a driving current to the VCM to move the actuator arm 8 toward the latch and integrates the estimated VCM velocity (derived from the back EMF voltage) to estimate the latch distance. At step 66 the integration is stopped when the back EMF voltage reverses polarity indicating that the actuator arm 8 has latched. At step 68, the deceleration distance S (corresponding to the integral of the deceleration velocity profile in FIG. 3C) is subtracted from the estimated latch distance to estimate the acceleration and coast distance corresponding to the acceleration and coast components of the velocity profile (FIG. 3C).

Referring again to FIG. 3B which is the flow diagram for latching the actuator arm 8 according to an embodiment of the present invention, when at step 70 the latch operation is initiated, at a step 72 the disk drive control circuitry 36 seeks the head 6 to an inner diameter track on the disk 4. At step 74 a driving current is applied to the VCM to accelerate the actuator arm 8 toward the latch, and at step 76 the back EMF voltage is evaluated to estimate the velocity of the VCM. At step 78 the driving current is adjusted so that the VCM velocity follows the acceleration and coast components of the velocity profile (FIG. 3C). At step 80 the disk drive control circuitry 36 waits for the actuator arm 8 to travel a distance equal to the acceleration and coast components of the velocity profile (estimated in FIG. 4A or FIG. 4B). In one embodiment, the estimated VCM velocity is integrated to estimate the distance traveled, and when the estimated distance traveled equals the estimated latch distance minus the estimated deceleration distance, at step 82 the driving current is applied to decelerate the VCM along the deceleration component of the velocity profile. In one embodiment, the estimated deceleration distance is the integral S of the deceleration component of the velocity profile (FIG. 3C).

Figure 5:
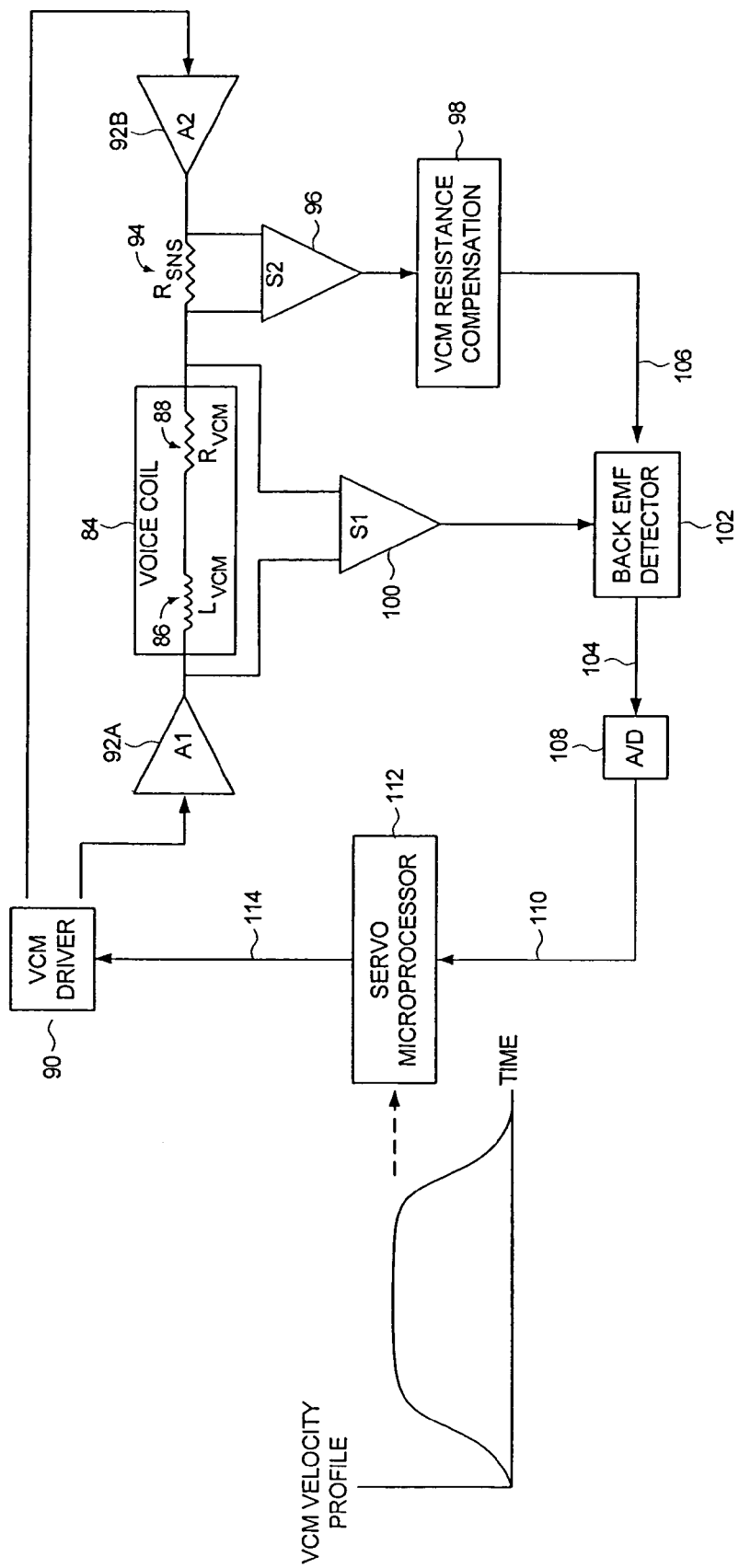
FIG. 5 shows an embodiment of the present invention wherein a resistance of the VCM is estimated and canceled from the back EMF voltage measurement to improve the estimated velocity measurement of the VCM.

The back EMF voltage generated by the VCM comprises a component due to the inductance of the voice coil, a component due to the resistance of the voice coil, and a component due to the velocity of the voice coil. At low frequencies the component due to the inductance can be ignored; however, the component due to the resistance may be significant and may change over time (e.g., the resistance changes with temperature). Therefore, in one embodiment the resistance of the voice coil is estimated and its contribution canceled from the back EMF voltage to obtain a more accurate estimate of the VCM velocity. This embodiment is illustrated in FIG. 5 which shows the voice coil 84 (comprising an inductance 86 and a resistance 88) driven by VCM driver 90 through amplifiers 92A and 92B. A sense resistor 94 and amplifier 96 sense the current flowing through the voice coil 84, and a VCM resistance compensation block 98 computes the contribution of the resistance (IR) to the back EMF voltage. Amplifier 100 senses the back EMF voltage across the voice coil 84, and a back EMF detector 102 generates a back EMF signal 104 representing the velocity of the VCM after canceling the detected IR voltage 106. The back EMF signal 104 is sampled by A/D circuit 108 and the resulting digital signal 110 processed by a servo microprocessor 112. The servo microprocessor 112 compares the estimated VCM velocity to the velocity profile to generate a control signal 114 applied to the VCM driver 90. In one embodiment, the resistance 88 of the voice coil 84 is periodically calibrated to account for changes that occur over time due, for example, to temperature changes.

Figure 6A:
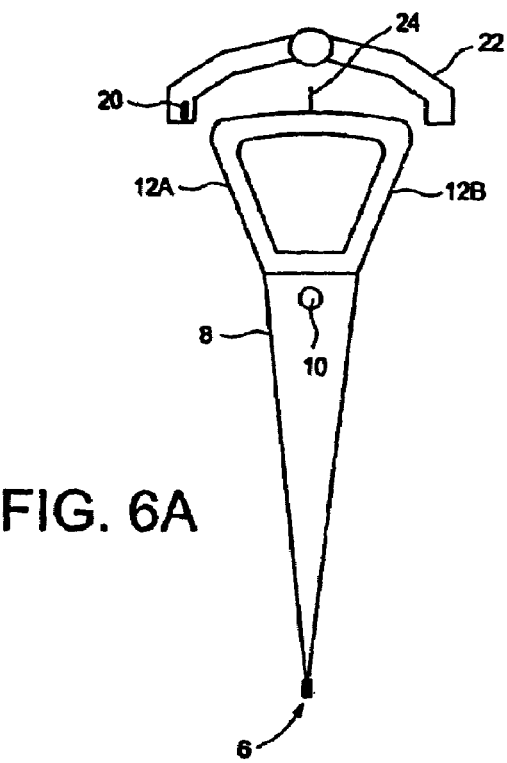
FIG. 6A shows an embodiment of the present invention wherein a magnet is embedded in a crash stop to reduce the maximum latching force of the magnet.

FIG. 6A shows an embodiment of the present invention wherein the latching magnet 20 is embedded into the crash stop 22 to reduce the maximum latching force of the magnet 20 which reduces the latch impact as well as the unlatch torque. For example, the crash stop may comprise a suitable plastic or rubber material wherein the magnet 20 is formed within the crash stop 22 through injection molding techniques. Further details of this embodiment are disclosed in the above-referenced U.S. Pat. No. 6,535,358 entitled "DISK DRIVE COMPRISING A PLASTIC MOLDED CRASH STOP WITH EMBEDDED MAGNET FOR LATCHING AN ACTUATOR ARM".

Figure 6B:
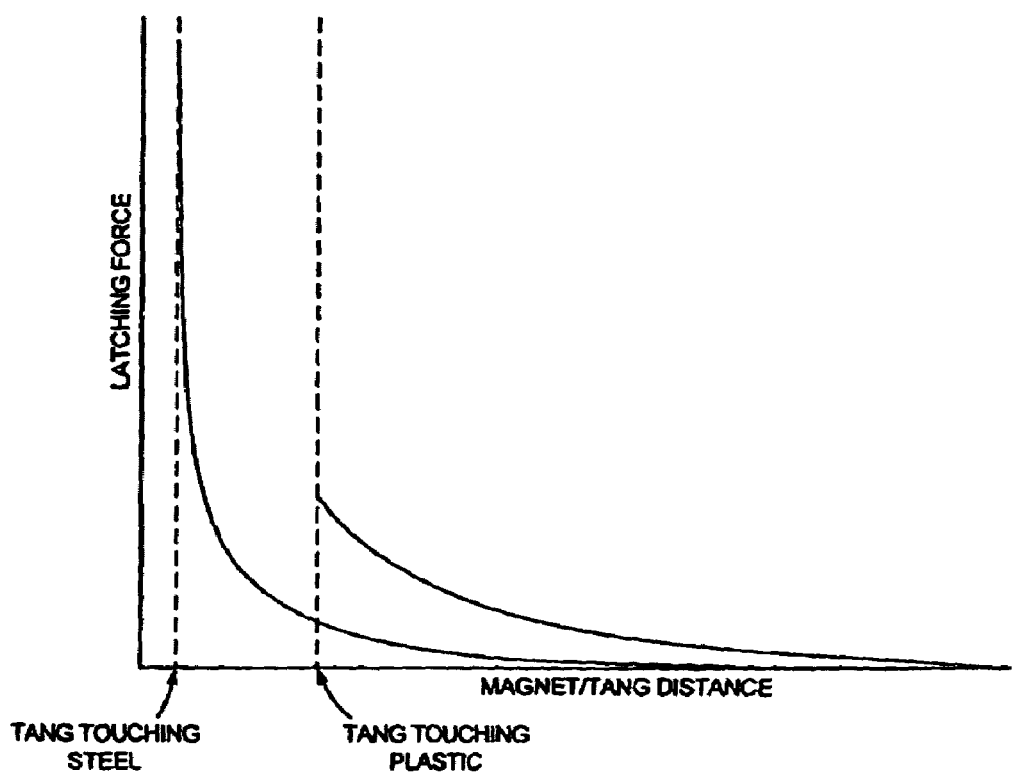
FIG. 6B illustrate the latching force of the magnet versus distance of the tang for the embodiment of FIG. 6A as compared to the prior art.

FIG. 6B illustrate the latching force of the magnet 20 versus the distance of the tang 24 for the embodiment of FIG. 6A as compared to the prior art. As seen in FIG. 6B, embedding the magnet into the crash stop 22 reduces the peak latching force of the magnet while decreasing the exponential decay of the latching force which maintains the latching energy of the magnet 20. Since the peak latching force is reduced, the latch impact is "softened" and a significantly lower torque is needed to unlatch the actuator arm 8 which means significantly less head wobble. Further, unlatching the actuator arm 8 using a closed-loop velocity profile (FIG. 2C) with back EMF voltage feedback compensates for the inconsistency in stickiness of the crash stop 22. That is, the closed-loop velocity profile results in a consistent unlatch operation even though the stickiness of the crash stop 22 may vary between disk drives or change over time due, for example, to changes in temperature.

We claim:

1. A disk drive comprising:
   (a) a disk comprising a plurality of tracks;
   (b) an actuator arm;
   (c) a head connected to a distal end of the actuator arm;
   (d) a voice coil motor (VCM) for rotating the actuator arm about a pivot to actuate the head over the disk; and
   (d) disk control circuitry for controlling the VCM by:
   applying a driving current to the VCM;
   detecting a back electromotive force (EMF) voltage generated by the VCM;
   estimating a velocity of the VCM in response to the back EMF voltage;
   comparing the estimated VCM velocity to a target velocity in a velocity profile, wherein the velocity profile comprises at least an acceleration component and a coast component;
   adjusting the driving current in response to the comparison so that the velocity of the VCM substantially follows the velocity profile; and
   estimating a latch distance corresponding to a distance the actuator arm travels during a latch operation by:
   performing an unlatch operation to unlatch the actuator arm;
   integrating the estimated VCM velocity during the unlatch operation to estimate an unlatch distance;
   detecting an unlatch track ID corresponding to a position of the head after the unlatch operation;
   performing a seek operation to seek the head from the unlatch track to an inner diameter track;
   integrating the estimated VCM velocity during the seek operation to estimate a seek distance; and
   subtracting the estimated seek distance from the estimated unlatch distance to estimate the latch distance.

2. The disk drive as recited in claim 1, wherein the velocity profile comprises a deceleration component.

3. The disk drive as recited in claim 1, wherein the acceleration component comprises a curve shape.

4. The disk drive as recited in claim 3, wherein the acceleration component comprises an S shape.

5. The disk drive as recited in claim 1, wherein the disk control circuitry for controlling the VCM to unlatch the actuator arm.

6. The disk drive as recited in claim 1, wherein the disk control circuitry for latching the actuator arm by:
   (a) performing a seek operation to seek the head to an inner diameter track;
   (b) moving the actuator arm toward the latch according to the acceleration component and coast component of the velocity profile;
   (c) integrating the estimated VCM velocity while moving the actuator arm to estimate a distance traveled; and
   (d) when the estimated distance traveled equals the estimated latch distance minus an estimated deceleration distance, decelerating the actuator arm toward the latch according to the deceleration component of the velocity profile.

7. The disk drive as recited in claim 6, wherein the estimated deceleration distance is the integral of the deceleration component of the velocity profile.

8. The disk drive as recited in claim 1, further comprising a magnetic latch comprising a stationary magnet for attracting a metal component of the actuator arm, wherein:
   (a) the magnet is covered at least partially with an insulating material; and
   (b) at least part of the insulating material is between the magnet and the metal component of the actuator arm to reduce the maximum latching force of the magnet.

9. The disk drive as recited in claim 8, wherein the insulating material comprises plastic.

10. The disk drive as recited in claim 8, wherein the insulating material comprises rubber.

11. A method of controlling the motion of an actuator arm in a disk drive, the disk drive comprising a disk having a plurality of tracks, the actuator arm, a head connected to a distal end of the actuator arm, and a voice coil motor (VCM) for rotating the actuator arm about a pivot to actuate the head over the disk, the method comprising the steps of:
   (a) applying a driving current to the VCM;
   (b) detecting a back electromotive force (EMF) voltage generated by the VCM;
   (c) estimating a velocity of the VCM in response to the back EMF voltage;
   (d) comparing the estimated VCM velocity to a target velocity in a velocity profile, wherein the velocity profile comprises at least an acceleration component and a coast component;
   (e) adjusting the driving current in response to the comparison so that the velocity of the VCM substantially follows the velocity profile; and
   (f) estimating a latch distance corresponding to a distance the actuator arm travels during a latch operation by:
   performing an unlatch operation to unlatch the actuator arm;
   integrating the estimated VCM velocity during the unlatch operation to estimate an unlatch distance;
   detecting an unlatch track ID corresponding to a position of the head after the unlatch operation;

performing a seek operation to seek the head from the unlatch track to an inner diameter track;

integrating the estimated VCM velocity during the seek operation to estimate a seek distance; and subtracting the estimated seek distance from the estimated unlatch distance to estimate the latch distance.

12. The method as recited in claim 11, wherein the velocity profile comprises a deceleration component.

13. The method as recited in claim 11, wherein the acceleration component comprises a curve shape.

14. The method as recited in claim 13, wherein the acceleration component comprises an S shape.

15. The method as recited in claim 11, wherein controlling the motion of the actuator arm unlatches the actuator arm.

16. The method as recited in claim 11, further comprising the step of latching the actuator arm comprising the steps of:
  (a) performing a seek operation to seek the head to an inner diameter track;
  (b) moving the actuator arm toward the latch according to the acceleration component and coast component of the velocity profile;
  (c) integrating the estimated VCM velocity while moving the actuator arm to estimate a distance traveled; and
  (d) when the estimated distance traveled equals the estimated latch distance minus an estimated deceleration distance, decelerating the actuator arm toward the latch according to the deceleration component of the velocity profile.

17. The method as recited in claim 16, wherein the estimated deceleration distance is the integral of the deceleration component of the velocity profile.

18. The method as recited in claim 11, wherein the disk drive further comprises a magnetic latch comprising a stationary magnet for attracting a metal component of the actuator arm, wherein:
  (a) the magnet is covered at least partially with an insulating material; and
  (b) at least part of the insulating material is between the magnet and the metal component of the actuator arm to reduce the maximum latching force of the magnet.

19. The method as recited in claim 18, wherein the insulating material comprises plastic.

20. The method as recited in claim 18, wherein the insulating material comprises rubber.

21. A disk drive comprising:
  (a) a disk comprising a plurality of tracks;
  (b) an actuator arm;
  (c) a head connected to a distal end of the actuator arm;
  (d) a voice coil motor (VCM) for rotating the actuator arm about a pivot to actuate the head over the disk; and
  (e) disk control circuitry for controlling the VCM by performing the steps of:
    applying a driving current to the VCM;
    detecting a back EMF voltage generated by the VCM;
    estimating a velocity of the VCM in response to the back EMF voltage;
    comparing the estimated VCM velocity to a target velocity in a velocity profile, wherein the velocity profile comprises at least an acceleration component and a coast component;
    adjusting the driving current in response to the comparison so that the velocity of the VCM substantially follows the velocity profile; and
    estimating a latch distance corresponding to a distance the actuator arm travels during a latch operation by:
      performing a seek operation to seek the head to an inner diameter track;
      moving the actuator arm toward the latch;
      integrating the estimated VCM velocity while moving the actuator arm to estimate the latch distance; and
      stopping the integration when the back EMF voltage reverses polarity indicating that the actuator arm has latched.

22. A method of controlling the motion of an actuator arm in a disk drive, the disk drive comprising a disk having a plurality of tracks, the actuator arm, a head connected to a distal end of the actuator arm, and a voice coil motor (VCM) for rotating the actuator arm about a pivot to actuate the head over the disk, the method comprising the steps of:
  (a) applying a driving current to the VCM;
  (b) detecting a back EMF voltage generated by the VCM;
  (c) estimating a velocity of the VCM in response to the back EMF voltage;
  (d) comparing the estimated VCM velocity to a target velocity in a velocity profile, wherein the velocity profile comprises at least an acceleration component and a coast component;
  (e) adjusting the driving current in response to the comparison so that the velocity of the VCM substantially follows the velocity profile; and
  (f) estimating a latch distance corresponding to a distance the actuator arm travels during a latch operation by:
    performing a seek operation to seek the head to an inner diameter track;
    moving the actuator arm toward the latch according to the acceleration component and coast component of the velocity profile;
    integrating the estimated VCM velocity while moving the actuator arm to estimate the latch distance; and
    stopping the integration when the back EMF voltage reverses polarity indicating that the actuator arm has latched.

* * * * *